United States Patent [19]

Burström et al.

[11] Patent Number: 4,642,204

[45] Date of Patent: Feb. 10, 1987

[54] METHOD OF CONTAINING RADIOACTIVE OR OTHER DANGEROUS WASTE MATERIAL AND A CONTAINER FOR SUCH WASTE MATERIAL

[75] Inventors: Martin Burström, Robertsfors; Ragnar Tegman, Umeå, all of Sweden

[73] Assignee: ASEA Aktiebolag, Vasteras, Sweden

[21] Appl. No.: 573,160

[22] Filed: Jan. 23, 1984

[30] Foreign Application Priority Data

Jan. 26, 1983 [SE] Sweden .................................. 8300387

[51] Int. Cl.$^4$ ........................... G21F 9/36; G21F 9/16
[52] U.S. Cl. ....................................... 252/633; 100/211; 250/506.1; 250/507.1; 252/628; 252/629; 264/0.5; 264/125; 264/332
[58] Field of Search ............... 252/628, 629, 633, 626; 250/506.1, 507.1; 264/0.5, 332, 125, 126, 319; 419/10, 42, 49; 220/83; 72/59; 425/78; 222/92-94; 100/211

[56] References Cited

U.S. PATENT DOCUMENTS

| | | | |
|---|---|---|---|
| 3,160,502 | 12/1964 | Quartullo | 75/200 |
| 3,340,056 | 9/1967 | Cloran et al. | 75/214 |
| 3,383,208 | 5/1968 | Corral | 75/214 |
| 3,935,467 | 1/1976 | Gablin | 250/507.1 |
| 4,058,479 | 11/1977 | White et al. | 250/507.1 |
| 4,115,311 | 9/1978 | Sump | 252/633 |
| 4,172,807 | 10/1979 | Larker | 264/0.5 |
| 4,280,921 | 7/1981 | May | 264/0.5 |
| 4,409,029 | 10/1983 | Larker et al. | 252/633 |
| 4,488,048 | 12/1984 | Bienek et al. | 250/506.1 |

FOREIGN PATENT DOCUMENTS 0044692 1/1982 European Pat. Off. ............ 252/633

OTHER PUBLICATIONS

Hoenig et al., 1983, Large Scale Densification of a Nuclear Waste Ceramic by Hot Isostatic Pressing, American Ceramic Society Bulletin, vol. 62(12): 1389-1390.

Primary Examiner—Stephen J. Lechert, Jr.
Assistant Examiner—Howard J. Locker
Attorney, Agent, or Firm—Watson, Cole, Grindle & Watson

[57] ABSTRACT

A method of containing radioactive or other dangerous material separately or intermixed with a bonding compound of a material, resistant to leaching by water, in a gas-tight container and of converting the material by hot isostatic pressing (HIP) into a dense body. The material is filled into a cylindrical container having a corrugated bellows-like wall. The dangerous material is prevented from filling up the annular spaces formed by the corrugations, by means of a barrier means placed inside the container. A metallic netting combined with a paper-like sheet of ceramic material makes a suitable barrier means.

14 Claims, 2 Drawing Figures

METHOD OF CONTAINING RADIOACTIVE OR OTHER DANGEROUS WASTE MATERIAL AND A CONTAINER FOR SUCH WASTE MATERIAL

BACKGROUND OF THE INVENTION

1. Field of the Invention

In the operation of nuclear power reactors and the reprocessing of spent nuclear fuel, radioactive waste products are obtained which must be handled with great care and disposed of safely by storing them for a long period of time in a geologically secure location, thus preventing any dispersal of such radioactive material into the biosphere.

The radioactive waste products may be in the form of particles or larger pieces of material. The particulate material may consist of highly radioactive consumed ion exchange compounds and residual products from fuel reprocessing operations which have been converted into solid form. The larger pieces of material may be, for example, parts of fuel element cladding tubes.

2. Description of Prior Art

One method for incorporating waste material into a solid body, which is resistant to leaching by water, is disclosed in the specification of Larker U.S. Pat. No. 4,172,807 (granted on Oct. 30, 1979 and assigned to the assignee of this application). Further details of such a method are disclosed in U.S. Pat. No. 4,409,028 granted Oct. 11, 1983 (and also assigned to the assignee of this application).

The radioactive waste material from filters and the high level radioactive waste from a reprocessing plant, after being converted into solid material, is mixed with a compound of a material resistant to leaching by water and filled into containers. The contents of the containers are pressed at a high isostatic pressure and at such a temperature (HIP) that bonding between the container contents is achieved, thus obtaining a dense, solid body. This high temperature compaction may be preceded by isostatic pressing at room temperature (CIP). Larger pieces, such as parts of cladding tubes, can be pressed with or without intermixing of particulate or granular material, which increases the fill factor but increases the resistance of the pieces prepared for storage to leaching by water.

During cold isostatic pressing (CIP) and/or hot isostatic pressing (HIP) of containers which are filled with material so that a relatively low fill factor is obtained, the container will be badly deformed as its wall is crushed in to fill the voids therein. If the fill factor is lower than 50%, the densification during hot isostatic pressing (HIP) generally takes place in an unstable manner, and this results in an unpredictable deformation of the container. The wall of the container can then be so badly deformed that it is subjected to a very high localized stress. These stresses may result in the container wall cracking and in the pressure medium used for generating the isostatic pressure penetrating into the interior of the container. The CIP and/or the HIP compression will then fail to achieve its intended purpose. This can be serious if the material being processed is expensive and is ruined by a container wall failure but is a near disaster if the material within the container is poisonous or radioactive and is spread with the pressure medium to contaminate the equipment during the subsequent pressure reduction.

In an attempt to avoid this problem it has been known when compressing material which has a low fill factor, to use a container with a corrugated bellows-like wall to facilitate the collapse of the container and reduce the risk of splitting of the container during compression. However, using a corrugated wall does not avoid high stresses developing at the junctions between the lid and the bottom and the bellows-like wall of the container.

OBJECTS OF THE INVENTION

One object of the present invention is to provide a method and a container in which the high stresses at the lid and the bottom of the container are reduced, thus reducing the risk of rupture and leakage. Another object is to provide a method and a container which permit a more controlled and regular deformation of the container without bending particularly in the case of a long container.

SUMMARY OF THE INVENTION

According to the invention, the dangerous material is led into a container having a cylindrical corrugated bellows-like wall but is prevented from filling up the annular spaces which are formed in the waves of the corrugation around the periphery of the container. The material to be packaged may be prevented from filling up these annular spaces by the provision of a cylindrical inner wall inside the corrugated container. Such an inner wall may be built up in a number of different ways depending on the material to be compressed.

Since the inner wall is intended (a) to give little resistance to axial compression of the container and (b) efficiently to prevent the dangerous material from forcing its way out into the annular spaces—formed by the crests of the corrugations—during the compression, the construction of the inner wall is of great importance. A cylinder made up of a closely-meshed net material may hold back pieces of cladding tubes and prevent them from filling up the corrugations. To prevent fine-grained material from filling up the corrugations, a comparatively dense but gas-permeable wall would be required. Such a wall may consist of several layers, for example one or more cylinders of net material, and between or inside such net cylinders one or more layers of ceramic paper-like or felt-like material. The orientation of the wires in the net cylinders, which form the inner wall, can be of great importance. At least one layer of wire netting in the inner wall should desirably have more than one turn of wires extending round the wall which turns are oriented substantially perpendicular to the longitudinal axis of the container. With the inner wall built up of netting in this way, the inner wall maintains its diameter during axial compaction of the container. The axially oriented wires of the wall will buckle even at a small axial load and therefore provide no significant resistance to the isostatic compaction.

The radioactive, or otherwise dangerous, material may be inter-mixed with a compound of a powder of a material resistant to leaching by water, which may be metallic or ceramic. It may consist of, for example, zircaloy, a synthetic rock material, for example a material with the designation SYNROC®, a natural rock material, such as a silicate material, quartz or a metallic oxide, such as titanium dioxide.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
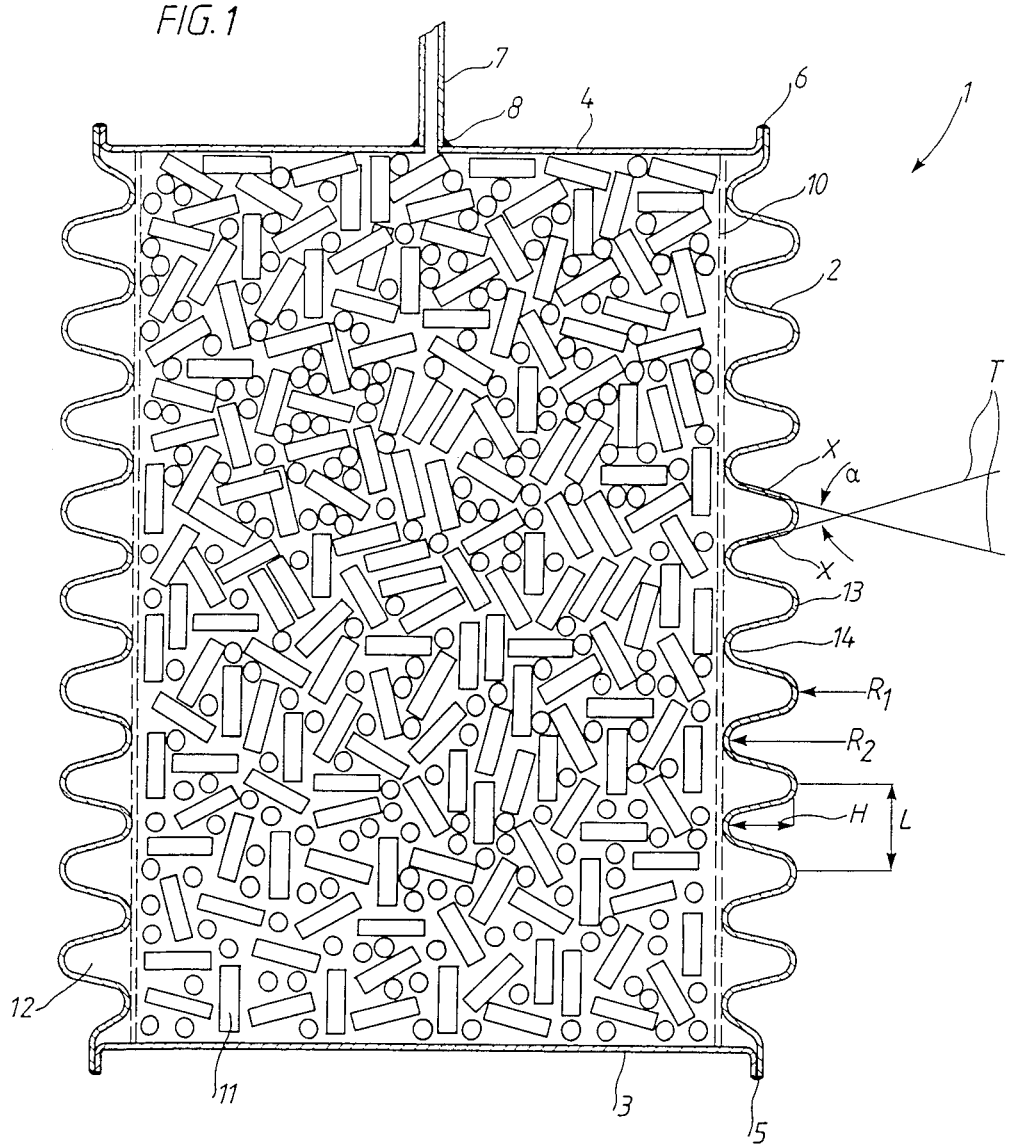
FIG. 1 shows a section through a container prepared for isostatic compression in accordance with the method of the invention of a charge of dangerous material.
Figure 2:
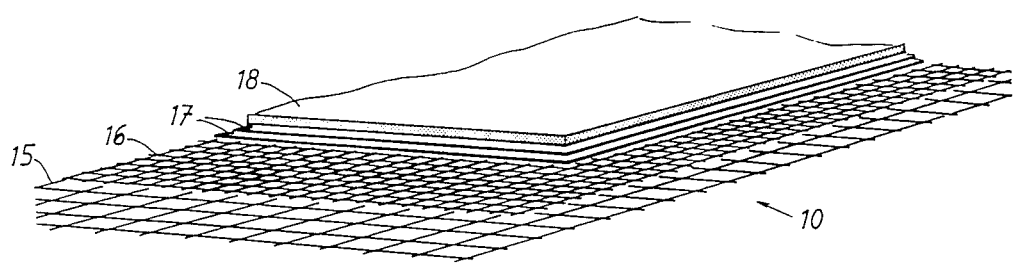
FIG. 2 shows, in an enlarged scrap view, details of the construction of the partition or inner wall shown in FIG. 1.

In FIG. 1, 1 designates a container which is built up of a corrugated bellows-like cylindrical wall 2 which is gas-tightly joined at its lower end to a bottom 3 and at its upper end to a lid 4, by means of welds 5 and 6, respectively. An evacuation tube 7 is connected to the lid 4 by means of a weld 8 and communicates with the interior of the container 1.

Inside the corrugated cylinder, a cylindrical inner wall 10 is arranged, which wall 10 prevents material 11 from filling up the annular spaces 12 which define the waves of the corrugations formed in the wall 2 when the container 1 is filled and subsequently during the compression of the container 1.

FIG. 1 shows the container 1 filled with stylised pieces of cladding tubes of zircaloy, which constitute the end product after leaching off of nuclear fuel during a fuel reprocessing operation. Alloying materials in these tube pieces may contain radioactive elements which have been formed during use of the tubes in a reactor core, or superficial radioactive impurities may be present.

The corrugation of the wall 2 is suitably effected in such a way that the tangents T at the points of inflection X to the crest of a corrugation of the wall 2 subtend an acute angle which is suitably smaller than 60°. The radius of curvature $R_1$ at the top 13 of each crest is suitably smaller than the radius of curvature $R_2$ at the trough 14 of each wave. The wave height H of the corrugations is suitably 0.5 to 2 times the wave length L of the corrugations.

The cylindrical inner wall 10, inside the container 1 may, when the container is intended for containing a fine-grained material, be built up of a first layer of an outer first metallic netting 15 and a second layer of an inner metallic netting 16. The netting 16 has a smaller mesh size than the netting 15. The mesh size may be about 2.5 mm in the first layer 15 and about 1 mm in the second layer 16. Inside these two layers of netting 15, 16 there is one or more sheets 17 of a paper-like ceramic material, for example a material with the trademark designation TRITON-KAOWOOL. Inside of this (or these) sheet(s) there may be a layer of $ZrO_2$ felt 18, which prevents the packing material 11 to be compressed from becoming bonded to the cylindrical inner wall or partition 10. This felt layer 18, allows sliding between the material 11 and the wall 10 and facilitates the compression by preventing the transmission of forces between the container 1 and the solid body formed from the material 11 during the compression. A partition wall 10 of the kind described, which is built up of cylinders of netting defining strong annular bands which give radial stability to the wall 10 and cylindrical layers 17 which seal the meshes in the netting, provides a wall having relatively low axial resistance to deformation and this has been found to be a considerable advantage during the pressing operation.

Clearly other detailed shapes of corrugated wall can be used, and other constructions of partition wall employed and all such modifications to the specific embodiment described which fall within the spirit and scope of the following claims represent features of the invention defined herein.

What is claimed is:

1. In a method of containing radioactive waste material in a gas-tight container and of converting the material contained within the container into a coherent dense body by isostatic compaction at a temperature necessary for bonding, which method comprises placing the radioactive waste material into a metal container, with a corrugated bellows-like cylindrical outer wall, evacuating the container, closing the container, and isostatically compressing the container, the improvement whereby
a barrier means, impermeable to the radioactive waste material, is located inside the outer wall of the container and the radioactive waste material is placed inside said barrier means, said barrier means and said outer wall defining an empty, material-free space, thereby allowing the corrugated bellows-like cylindrical outer wall to be folded without interference during axial collapse of the container during said isostatic compression, and said barrier means comprising at least one circumferential layer of wire netting with wires extending around said barrier means, and means preventing the radioactive waste material from passing through said layer of wire netting.

2. A method as claimed in claim 1, in which said barrier means comprises a cylindrical second wall arranged inside said outer wall,
said second wall comprising at least one wire netting layer with wires extending around the cylindrical second wall.

3. A method according to claim 1, in which the isostatic compression is carried out in a furnace at an elevated temperature.

4. A method according to claim 2, in which the radioactive waste material is mixed with a solid metallic material prior to being placed in the container.

5. A method according to claim 1, in which the radioactive waste material, prior to being placed inside the barrier means, is mixed with a solid material selected from the group consisting of natural rock material, synthetic rock material, a glass, quartz or a metallic oxide such as titanium dioxide.

6. A method according to claim 2, in which the radioactive waste material, prior to being placed inside the second wall, is mixed with a solid material selected from the group consisting of natural rock material, synthetic rock material, a glass, quartz or a metallic oxide such as titanium dioxide.

7. A container for containing radioactive waste material which is to be converted into a solid body by hot isostatic pressing, which container comprises
a gas-tight tubular outer wall with annular corrugations provided therein,
a gas-tight bottom gas-tightly sealed to one end of said tubular outer wall,
a gas-tight bottom gas-tightly sealed to the other end of said tubular outer wall, and a cylindrical inner wall arranged inside said corrugated outer wall, said inner wall comprising at least one circumferential layer of wire netting with wires extending around the inner wall, and means preventing the radioactive waste material from passing through said layer of wire netting, said inner wall and said outer wall defining an empty, material-free space, thereby allowing the outer wall to be folded without interference during axial collapse of the container during the isostatic pressing preventing the contained radioactive waste material from penetrating between the walls out into the annular spaces, formed by the corrugations, in the outer wall.

8. A container according to claim 7, in which the inner wall comprises at least one cylinder of metallic netting and said means comprises at least one layer of paper- or felt-like ceramic material disposed against said netting cylinder(s).

9. A container according to claim 7, in which the convex part of each annular corrugation, as viewed from outside the container, has a smaller radius of curvature than the concave parts thereof.

10. A container according to claim 8, in which the convex part of each annular corrugation, as viewed from outside the container has a smaller radius of curvature than the concave parts thereof.

11. A container according to claim 9, in which the tangents at the points of inflection of said convex part of each annular corrugation subtend an angle which is smaller than 60°.

12. A container according to claim 10, in which the tangents at the points of inflection of said convex part of each annular corrugation subtend an angle which is smaller than 60°.

13. A container according to claim 7, in which the depth of each annular corrugation is 0.5 to 2 times the wave length of the annular corrugations.

14. A container according to claim 12, in which the depth of each annular corrugation is 0.5 to 2 times the wave length of the annular corrugations.

* * * * *